(12) United States Patent
LaCroix

(10) Patent No.: US 10,716,301 B2
(45) Date of Patent: Jul. 21, 2020

(54) FISH STRIKE SIGNALING ASSEMBLY

(71) Applicant: Douglas LaCroix, Jewett City, CT (US)

(72) Inventor: Douglas LaCroix, Jewett City, CT (US)

( * ) Notice: Subject to any disclaimer, the term of this patent is extended or adjusted under 35 U.S.C. 154(b) by 314 days.

(21) Appl. No.: 15/855,424

(22) Filed: Dec. 27, 2017

(65) Prior Publication Data

US 2019/0191688 A1  Jun. 27, 2019

(51) Int. Cl.
*A01K 97/12* (2006.01)
*A01K 97/01* (2006.01)

(52) U.S. Cl.
CPC .......... *A01K 97/125* (2013.01); *A01K 97/01* (2013.01)

(58) Field of Classification Search
CPC ....... A01K 97/125; A01K 97/12; A01K 97/01
USPC .......................................................... 43/17
See application file for complete search history.

(56) References Cited

U.S. PATENT DOCUMENTS

| | | | | |
|---|---|---|---|---|
| 2,651,875 A * | 9/1953 | Brockman | ............. | A01K 97/01 43/17 |
| 2,741,054 A * | 4/1956 | Brundage | ............. | A01K 97/01 43/17 |
| 2,834,140 A * | 5/1958 | Knier | ............. | A01K 97/01 43/17 |
| 3,196,570 A * | 7/1965 | Borisch | ............. | A01K 97/01 43/17 |
| 4,183,076 A * | 1/1980 | Bodde | ............. | A01K 97/01 362/120 |
| 4,209,930 A * | 7/1980 | Boynton | ............. | A01K 97/01 43/17 |
| 4,270,297 A * | 6/1981 | Yates | ............. | A01K 97/01 43/17 |
| 4,528,554 A * | 7/1985 | Klefbeck | ............. | A01K 97/125 340/573.2 |
| 4,567,686 A * | 2/1986 | Akom | ............. | A01K 97/01 43/17 |
| 4,660,316 A * | 4/1987 | Gamelin | ............. | A01K 97/125 43/17 |
| 4,707,932 A * | 11/1987 | Sonnemaker | ............. | A01K 97/01 43/17 |
| 4,727,673 A * | 3/1988 | Dumar | ............. | A01K 97/01 362/191 |
| 4,887,777 A * | 12/1989 | Rasmussen | ............. | A01K 89/017 242/390.8 |
| 4,907,363 A * | 3/1990 | Dury | ............. | A01K 97/125 43/15 |
| 4,928,419 A * | 5/1990 | Forrestal | ............. | A01K 97/01 43/17 |
| 4,993,182 A * | 2/1991 | Monsen | ............. | A01K 97/01 43/17 |
| 5,025,583 A | 6/1991 | Langley | | |
| 5,067,269 A * | 11/1991 | Eppley | ............. | A01K 97/01 43/17 |

(Continued)

FOREIGN PATENT DOCUMENTS

CA        2759463 A1 *  5/2012   ............. A01K 97/01

*Primary Examiner* — Christopher P Ellis

(57) ABSTRACT

A fish strike signaling assembly for alerting a user to a fish strike includes a tip-up that catches fish. A lighting unit is coupled to the tip-up. The lighting unit emits a visible light when the tip-up is triggered. A power supply is electrically coupled to the lighting unit. A power button is electrically coupled to the power supply and is actuated to an on position to provide power to the lighting unit.

8 Claims, 5 Drawing Sheets

(56) References Cited

U.S. PATENT DOCUMENTS

| | | | |
|---|---|---|---|
| 5,133,144 A * | 7/1992 | Formica | A01K 97/01 43/17 |
| 5,448,849 A * | 9/1995 | Burgett | A01K 97/01 43/17 |
| 5,488,796 A * | 2/1996 | Taylor | A01K 97/01 43/17 |
| D375,996 S | 11/1996 | Weatherman | |
| 5,598,656 A * | 2/1997 | Strasser | A01K 97/01 43/17 |
| 5,896,694 A * | 4/1999 | Midha | A01K 97/01 43/17 |
| 5,979,101 A | 11/1999 | Muenchow | |
| 6,105,300 A * | 8/2000 | Abdo | A01K 97/01 43/17 |
| 7,343,708 B2 | 3/2008 | Pieczynski | |
| 8,881,445 B2 | 11/2014 | Nolf | |
| 9,095,130 B2 | 8/2015 | Coulson | |
| 2006/0150469 A1 * | 7/2006 | Allen, Jr. | A01K 97/01 43/17 |
| 2007/0011934 A1 * | 1/2007 | Rayfield | A01K 97/10 43/17 |
| 2007/0169395 A1 | 7/2007 | Rayfield | |
| 2007/0227057 A1 * | 10/2007 | Holmberg | A01K 97/01 43/17 |
| 2009/0139130 A1 * | 6/2009 | Nozzarella | A01K 97/01 43/17 |
| 2009/0165354 A1 * | 7/2009 | Rand | A01K 97/01 43/17 |
| 2012/0291332 A1 * | 11/2012 | Nolf | A01K 97/01 43/17 |
| 2013/0227873 A1 * | 9/2013 | Coulson | A01K 97/125 43/17 |
| 2014/0157651 A1 * | 6/2014 | Trout | A01K 97/125 43/17 |
| 2015/0208633 A1 * | 7/2015 | Schramski | A01K 97/01 43/4.5 |
| 2018/0206470 A1 * | 7/2018 | Casavant | A01K 97/01 |

* cited by examiner

FISH STRIKE SIGNALING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to alerting systems and more particularly pertains to a new alerting system for alerting a user to a fish strike.

BRIEF SUMMARY OF THE INVENTION

An embodiment of the disclosure meets the needs presented above by generally comprising what is conventionally known as a tip-up which is configured to catch fish through a hole in ice. A lighting unit is coupled to the tip-up. The lighting unit emits a visible light when the tip-up is triggered. A power supply is electrically coupled to the lighting unit. A power button is electrically coupled to the power supply and is actuated to an on position to provide power to the lighting unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
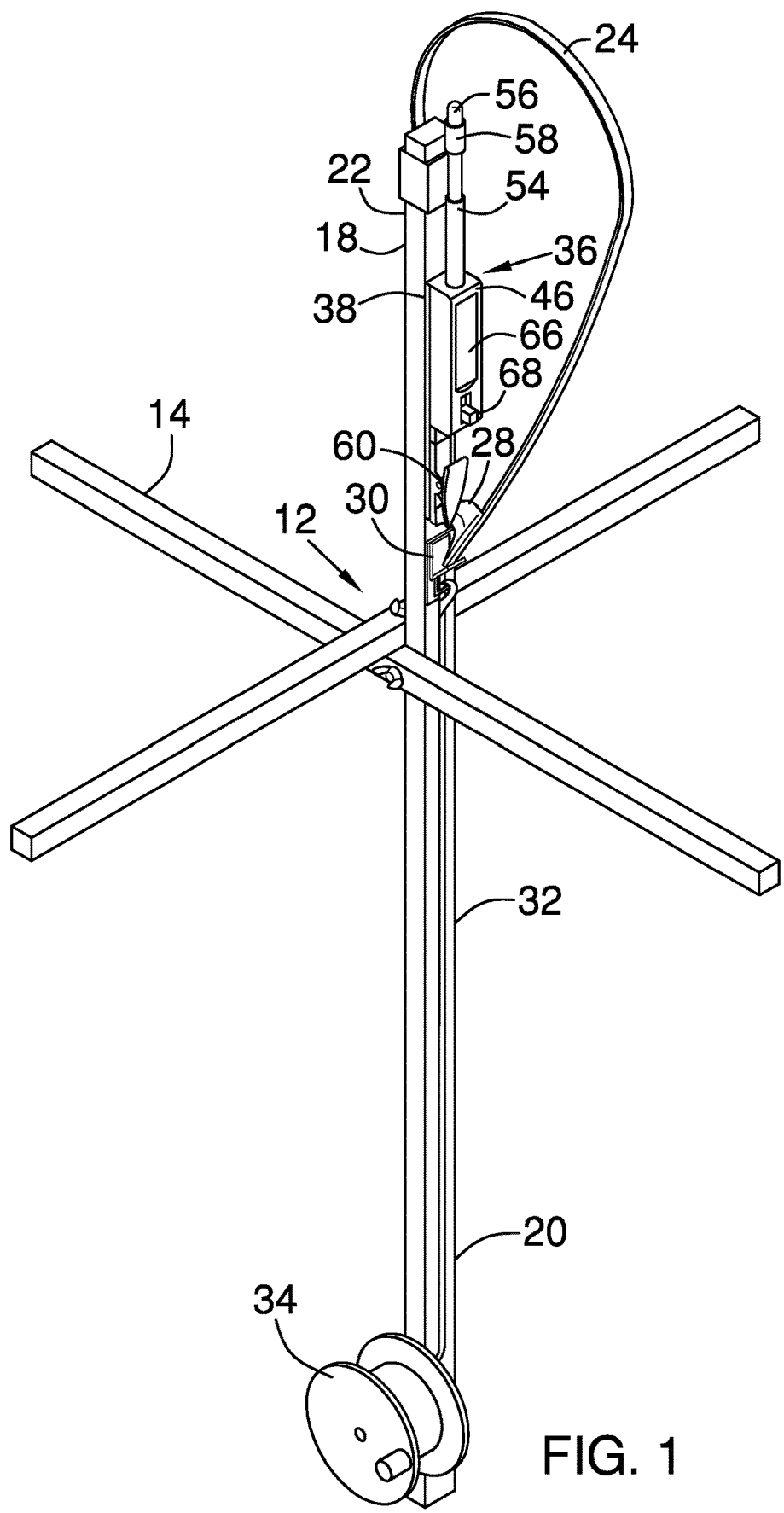
FIG. 1 is a top side view of a Fish strike signaling assembly according to an embodiment of the disclosure.
Figure 2:
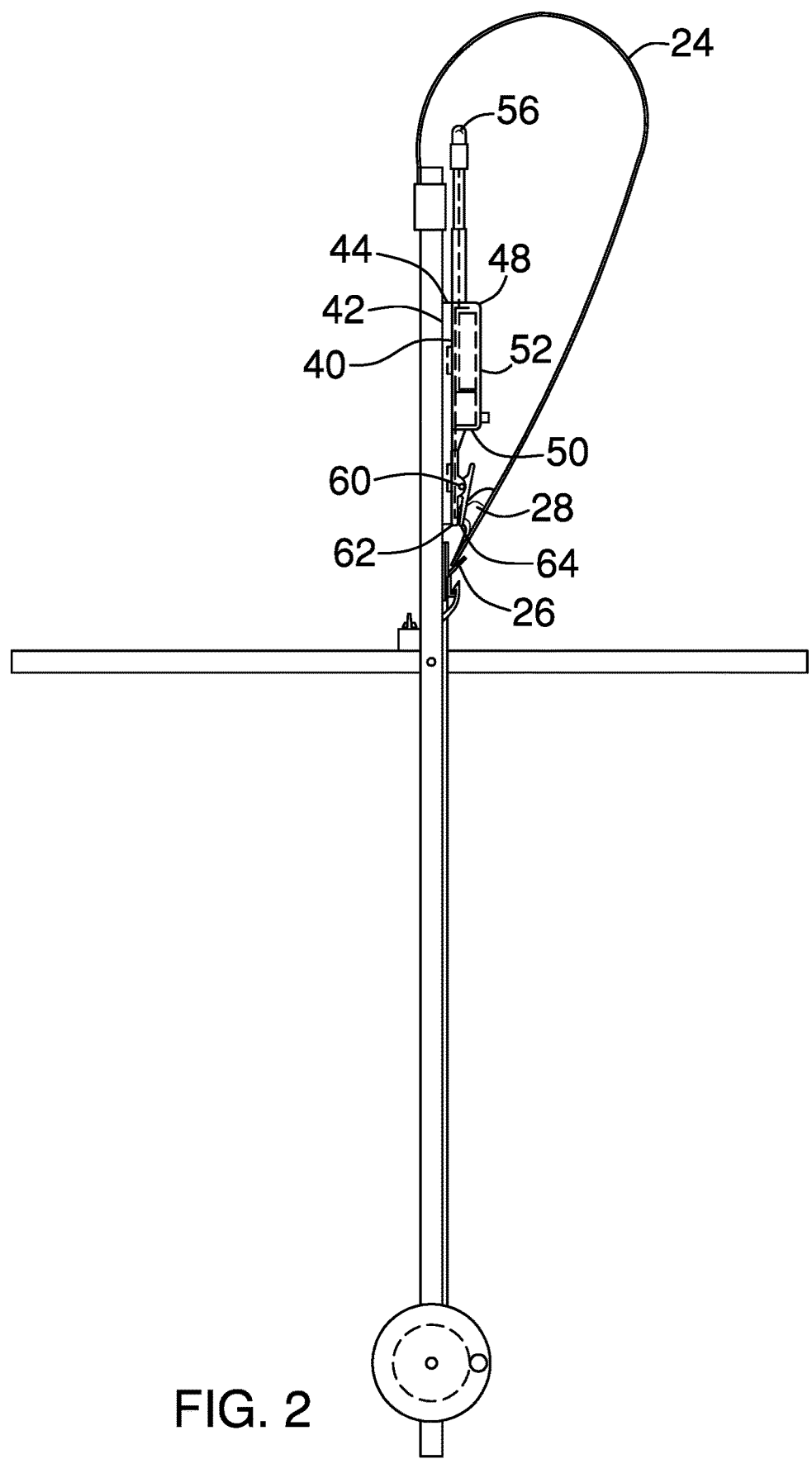
FIG. 2 is a side view of an embodiment of the disclosure.
Figure 3:
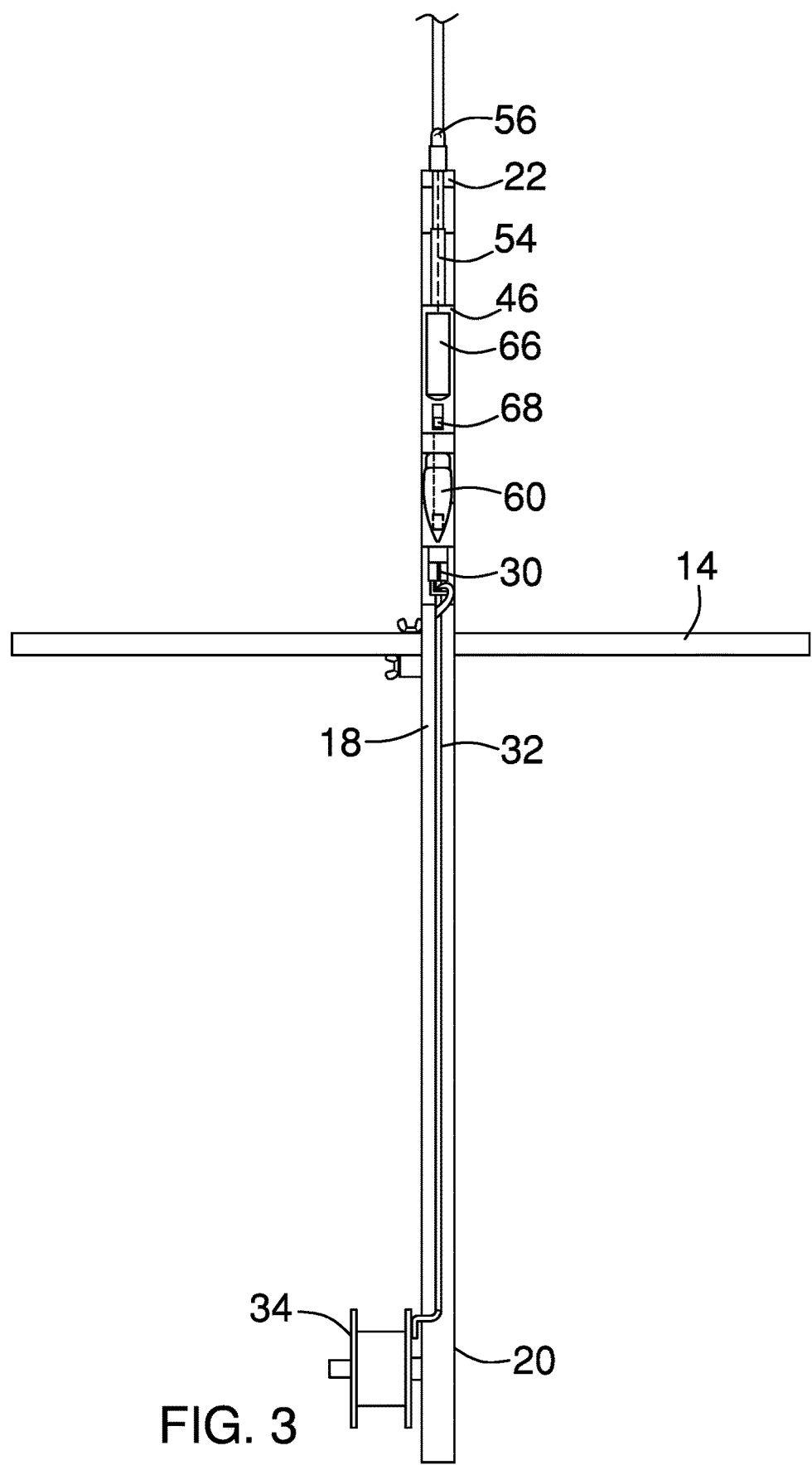
FIG. 3 is a front view of an embodiment of the disclosure.
Figure 4:
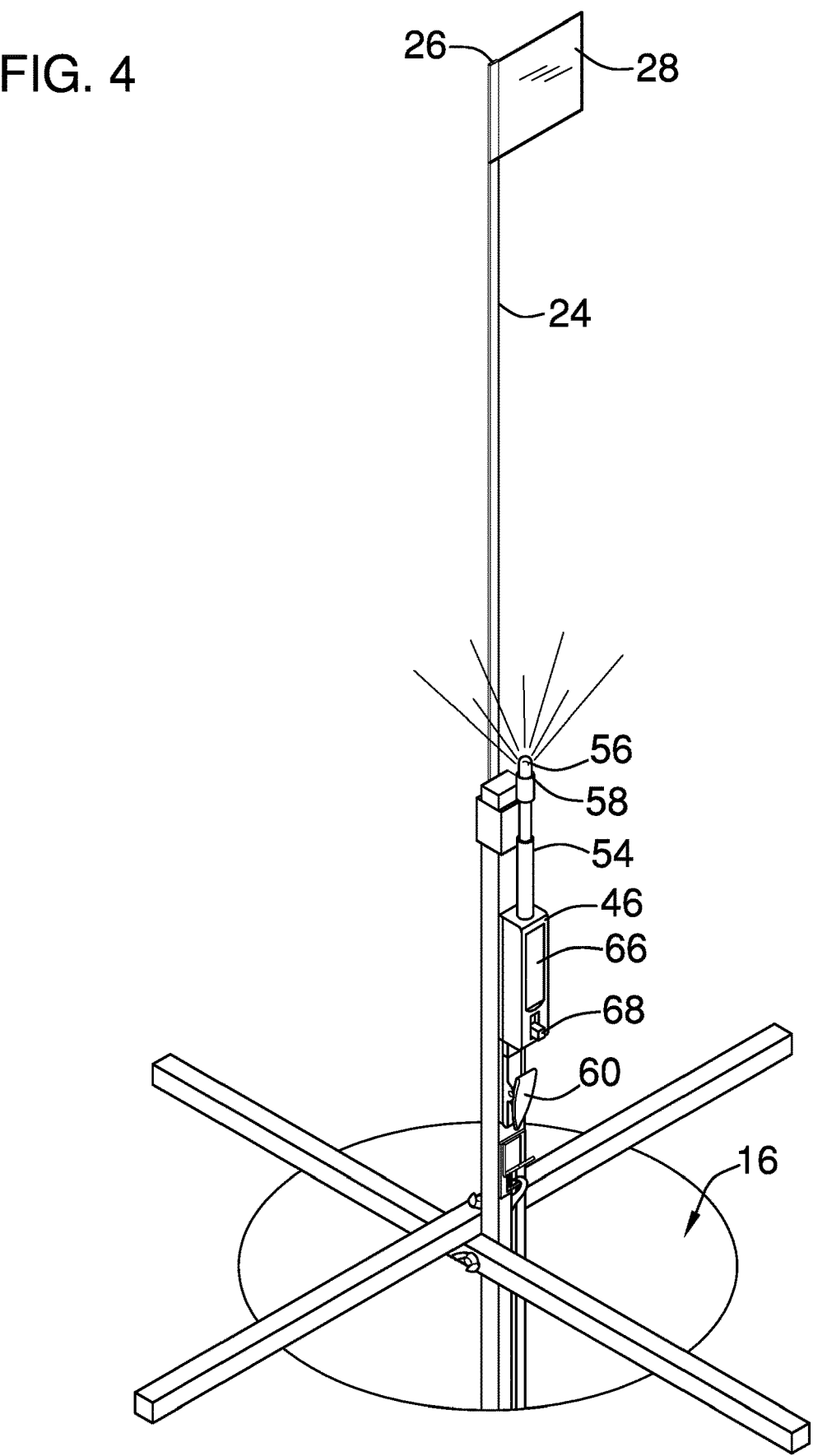
FIG. 4 is a top side view of an embodiment of the disclosure.
Figure 5:
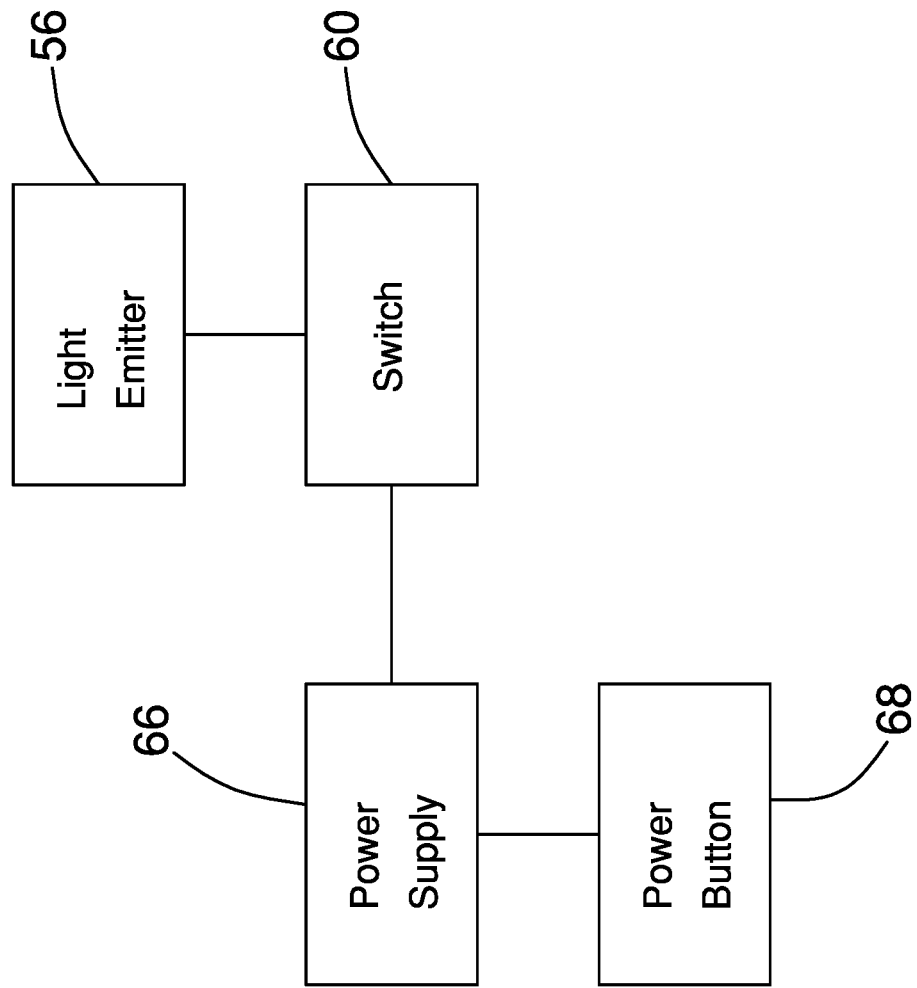
FIG. 5 is a schematic box diagram of an embodiment of the disclosure.

With reference now to the drawings, and in particular to FIGS. 1 through 5 thereof, a new alerting system embodying the principles and concepts of an embodiment of the disclosure and generally designated by the reference numeral 10 will be described.

As best illustrated in FIGS. 1 through 5, the Fish strike signaling assembly 10 generally comprises a tip-up 12 that catches fish. The tip-up 12 includes a horizontal support 14 that rests upon ice and traverses an opening 16 extending through the ice. A vertical support 18 is attached to the horizontal support 14 and extends upwardly and downwardly therefrom. The vertical support 18 includes a lower portion, which extends into a body of water, and an upper portion 22 extending upwardly from the horizontal support 14.

A post 24 is attached to the upper portion 22 of the vertical support 18. The post 24 has a free end 26. The post 24 is comprised of a resiliently bendable material. The free end 26 extends upwardly from the vertical support 18 when the post 24 is in a released position. A flag 28 is attached to the post 24 adjacent to the free end 28. A catch 30 is mounted on the upper portion 22, and retains the free end 26 adjacent to the upper portion 22 in set position until the catch is actuated. The catch 30 may be movable vertically on the upper portion 22.

A trip wire 32 is attached to the catch 30. A reel 34 is attached to the lower portion 20 and is mechanically engaged to the trip wire 32. The trip wire 32 is pulled and actuates the catch 30 to release the post 24 to the released position when the reel 34 is rotated relative to the vertical support 18. A fishing line may be wound around the reel with a hook attached to a distal end of the fishing line relative to the reel 34. When a fish bites the hook and swims away from the reel 34, the fishing line unwinds and spins the reel 34. When the reel 34 is spun the trip wire 32 pulls the catch 30 downwardly toward the reel 34 to trigger the tip-up 12 and release the free end 28 of the post 24.

A lighting unit 36 is coupled to the tip-up 12 and emits a visible light when the tip-up 12 is triggered. The lighting unit 36 comprises a base 38 having a front wall 40, a back wall 42 and a perimeter wall 44 that is attached to and extends between the front wall 40 and the back wall 42. The back wall 42 is mounted to the tip-up 12 such that the back wall 42 is positioned on the upper portion 22.

A housing 46 is mounted on the base 38. The housing 46 has a top wall 48, a bottom wall 50 and a peripheral wall 52 that is attached to and extends between the top wall 48 and the bottom wall 50. The peripheral wall 52 is attached to the front wall 40 of the base 38. A pole 54 is attached to and extends outwardly from the housing 46. The pole 54 extends upwardly from the top wall 48 of the housing 46. The pole 54 is telescopic and has a selectively adjustable height.

A light emitter 56 is attached to a distal end 58 of the pole 54 relative to the housing 46. The light emitter 56 emits a visible light when turned on. A switch 60 is electrically coupled to the light emitter 56 and is in mechanical communication with the tip-up 12. The switch 60 turns on the light emitter 56 when the tip-up 12 is triggered. The switch 60 includes a pair of contacts 62, 64 biased toward each other. The flag 28 is positioned between the contacts 62, 64 when the post 24 is in the set position such that current is inhibited from flowing between the contacts 62, 64. The flag 28 is pulled or urged outwardly away from the contacts 62, 64 when the catch 30 releases the post 24 such that contacts 62, 64 abut and current flows between the contacts 62, 64 to turn the light emitter 56 on. The switch 60 includes a clip that has a pair of jaws. Each of the jaws includes one of the contacts 62, 64.

A power supply 66 is electrically coupled to the lighting unit 36. The power supply 66 is mounted in the housing 46 and comprises at least one battery. A power button 68 is electrically coupled to the power supply 66 and is actuated to an on position to provide power to the lighting unit 36.

In use, the power button 68 is actuated to provide power to the lighting unit 36. The free end 26 of the post 24 is placed in the catch 30. The flag 28 is positioned between the contacts 62, 64 to inhibit current from flowing to the light emitter 36. When the reel spins, the trip wire is pulled to release the free end of the post from the catch. The flag 28 is released from between the contacts 62, 64 to allow the current to flow through each contact 62, 64 to illuminate the light emitter 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fish strike alerting system configured to alert a user when a fish bite has been detected, said fish strike alerting system comprising:
    a tip-up configured for catching fish;
    a lighting unit being coupled to said tip-up, said lighting unit emitting a visible light when said tip-up is triggered;
    a power supply being electrically coupled to said lighting unit;
    a power button being electrically coupled to said power supply and being actuated to an on position to provide power to said lighting unit;
    wherein said tip-up comprises
        a horizontal support being configured to rest upon ice and traverse an opening extending through the ice, and
        a vertical support being attached to said horizontal support and extending upwardly and downwardly therefrom, said vertical support including a lower portion configured to be extended into a body of water and an upper portion extending upwardly from said horizontal support,
        a post being attached to said upper portion of said vertical support, said post having a free end, said post being comprised of a resiliently bendable material, said post having a free end extending upwardly from said vertical support when said post is in a released position,
        a flag being attached to said post adjacent to said free end,
        a catch being mounted on said upper portion, said catch retaining said free end adjacent to said upper portion in set position until said catch is actuated,
        a trip wire being attached to said catch, and
        a reel being attached to said lower portion and being mechanically engaged to said trip wire, said trip wire being pulled and actuating said catch to release said post to said released position when said reel is rotated relative to said vertical support; and
    wherein said lighting unit comprises
        a base having a front wall, a back wall and a perimeter wall being attached to and extending between said front wall and said back wall, said back wall being attached to said tip-up, said back wall being positioned on said upper portion, and
        a housing being mounted on said base, said housing having a top wall, a bottom wall and a peripheral wall being attached to and extending between said top wall and said bottom wall, said peripheral wall being attached to said front wall of said base.

2. The fish strike alerting system according to claim 1, wherein said lighting unit comprises:
    a pole being attached to and extending outwardly from said housing, said pole extending upwardly from said top wall of said housing;
    a light emitter being attached to a distal end of said pole relative to said housing, said light emitter emitting a visible light when turned on; and
    a switch being electrically coupled to said light emitter.

3. The fish strike alerting system according to claim 2, wherein said pole is telescopic and has a selectively adjustable height.

4. The fish strike alerting system according to claim 3, wherein said switch is in mechanical communication with said tip-up, said switch turning on said light emitter when said tip-up is triggered.

5. The fish strike alerting system according to claim 4, wherein said switch includes a pair of contacts biased toward each other, said flag being positioned between said contacts when said post is in said set position such that current is inhibited from flowing between said contacts, said flag being urged outwardly away from said contacts when said catch releases said post such that current flows between said contacts and said light emitter is turned on.

6. The fish strike alerting system according to claim 5, wherein said switch includes a clip having a pair of jaws, each of said jaws including one of said contacts.

7. The fish strike alerting system according to claim 1, wherein said power supply is mounted in said housing, said power supply comprising at least one battery.

8. A fish strike alerting system configured to alert a user when a fish bite has been detected, said fish strike alerting system comprising:
- a tip-up configured for catching fish, said tip-up comprising:
  - a horizontal support being configured to rest upon ice and traverse an opening extending through the ice;
  - a vertical support being attached to said horizontal support and extending upwardly and downwardly therefrom, said vertical support including a lower portion configured to be extended into a body of water and an upper portion extending upwardly from said horizontal support;
  - a post being attached to said upper portion of said vertical support, said post having a free end, said post being comprised of a resiliently bendable material, said post having a free end extending upwardly from said vertical support when said post is in a released position;
  - a flag being attached to said post adjacent to said free end;
  - a catch being mounted on said upper portion, said catch retaining said free end adjacent to said upper portion in set position until said catch is actuated;
  - a trip wire being attached to said catch;
  - a reel being attached to said lower portion and being mechanically engaged to said trip wire, said trip wire being pulled and actuating said catch to release said post to said released position when said reel is rotated relative to said vertical support;
- a lighting unit being coupled to said tip-up, said lighting unit emitting a visible light when said tip-up is triggered, said lighting unit comprising:
  - a base having a front wall, a back wall and a perimeter wall being attached to and extending between said front wall and said back wall, said back wall being attached to said tip-up, said back wall being positioned on said upper portion;
  - a housing being mounted on said base, said housing having a top wall, a bottom wall and a peripheral wall being attached to and extending between said top wall and said bottom wall, said peripheral wall being attached to said front wall of said base;
  - a pole being attached to and extending outwardly from said housing, said pole extending upwardly from said top wall of said housing, said pole being telescopic and having a selectively adjustable height;
  - a light emitter being attached to a distal end of said pole relative to said housing, said light emitter emitting a visible light when turned on;
  - a switch being electrically coupled to said light emitter, said switch being in mechanical communication with said tip-up, said switch turning on said light emitter when said tip-up is triggered, said switch including a pair of contacts biased toward each other, said flag being positioned between said contacts when said post is in said set position such that current is inhibited from flowing between said contacts, said flag being urged outwardly away from said contacts when said catch releases said post such that current flows between said contacts and said light emitter is turned on, said switch including a clip having a pair of jaws, each of said jaws including one of said contacts;
- a power supply being electrically coupled to said lighting unit, said power supply being mounted in said housing, said power supply comprising at least one battery; and
- a power button being electrically coupled to said power supply and being actuated to an on position to provide power to said lighting unit.

\* \* \* \* \*